C. P. BROWN.
Seed-Dropper.
No. 58,588.
Patented Oct. 9, 1866.
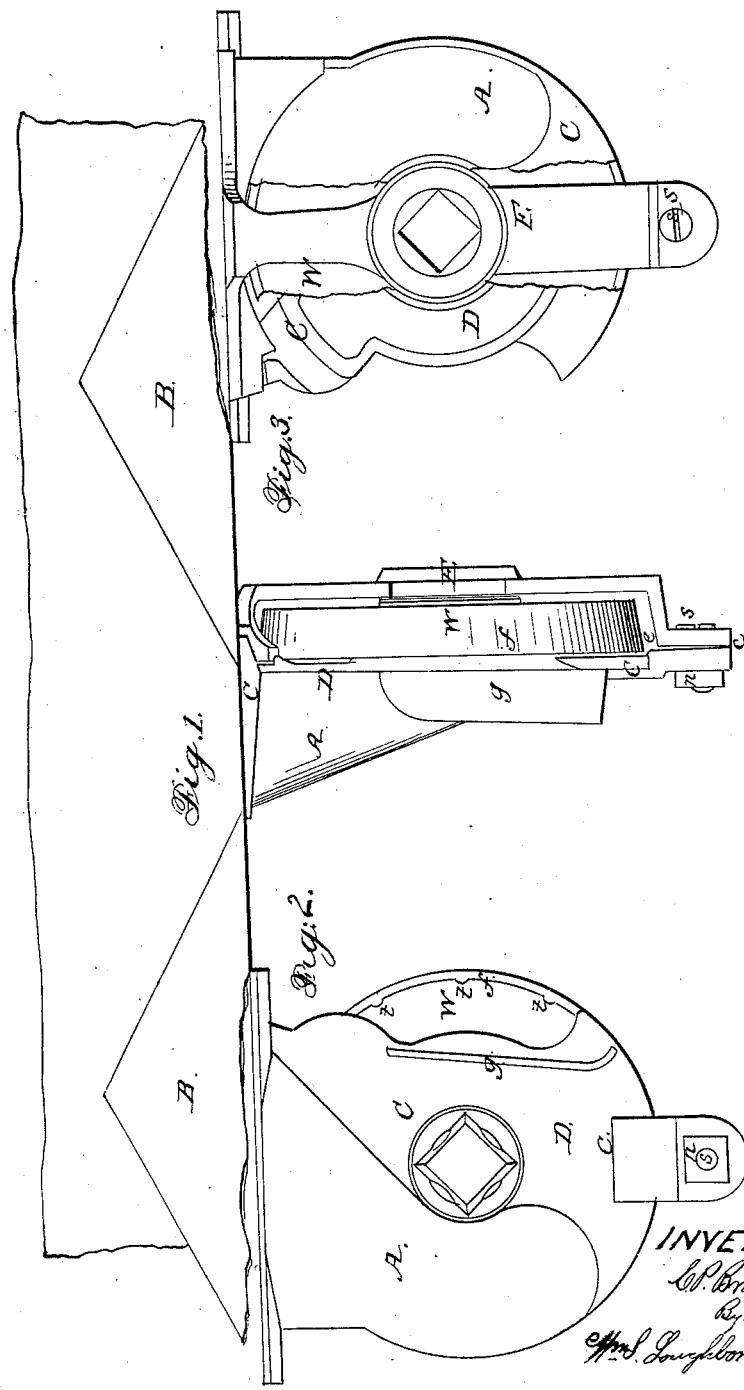

UNITED STATES PATENT OFFICE.

C. P. BROWN, OF SHORTSVILLE, NEW YORK.

IMPROVEMENT IN SEED-PLANTERS.

Specification forming part of Letters Patent No. 58,588, dated October 9, 1866.

*To all whom it may concern:*

Be it known that I, C. P. BROWN, of Shortsville, in the county of Ontario and State of New York, have invented certain new and useful Improvements in Seeding-Machines; and I do hereby declare that the following is a full, clear, and exact description thereof, reference being had to the accompanying drawings, making part of this specification, in which—

Figure 1 is a rear elevation of the distributers D, and showing a section of the bottom part of the seed-box (one side being removed) and two of the beveled blocks or chutes B, which constitute the hopper-shaped bottom. Fig. 2 is an elevation of the left-hand side of the distributer. Fig. 3 is an elevation of the right-hand side of the same, a portion of the wheel W being broken away on each side of the center, so as to show the construction of the inner face of the case C of the distributers D.

Similar letters of reference indicate corresponding parts in all the figures.

This invention consists in providing the bottom of the seed-box of grain-drills having several distributers with a beveled block between them, in such a manner as to form inclined planes to guide the seed each way into the mouth of the distributers, the sides of the seed-box being beveled front and rear.

It also consists in enlarging the seed-chamber of the vertical disk-distributer, thereby rendering it capable of sowing all kinds of seed through the same delivery, and providing the delivery-wheel with an adjustable supporting-bar or back on the opposite side from the seed-case.

To enable others to make and use my invention, I will describe its construction and operation.

I construct the grain-box in the ordinary way, the front and rear sides being beveled, and place a beveled block, B, between the distributers, whereby all the seed which formerly lodged on the flat spaces at the bottom of the box will be conveyed by its gravity into the distributers.

I enlarge the seed-chamber A, Figs. 1 and 2, and also the depth of the flange $f$, Figs. 1 and 2, of the delivery-wheel, whereby the different kinds of grain may be sown with a single-passage distributer. I also, by this means, dispense with the disk-plate formerly used on the right-hand side of this class of distributers, and substitute the bar E to support the delivery-wheel W. This bar is so made as to have a bearing against the case at the top and at $c$, but leaving an open space at $e$, Fig. 1, so that by means of the clamping-screw $s$ and nut $n$ the center of the bar may be sprung in more or less, as may be necessary, in order to retain the wheel in position, and at the same time secure proper freedom in its action.

There is also a wind-guard, $g$, arranged in front of the discharge-opening, to prevent any current of air from interrupting or disturbing the regular discharge of the seed from the distributer. The distributer is driven by a shaft running through the series, the same as the vertical-disk distributers heretofore made.

By enlarging the chamber A and the cavity between the case and wheel, and thereby adapting this circuit to the various kinds of grain, it is found that the machine will distribute the seed with far greater accuracy and uniformity, especially light grain, than the former distributers, because the seed in this case always rests upon the rim or flange $f$ of the wheel, and is carried out by the starts $t$, while in the other case the corresponding rim $f$ was attached to the case C, and the starts moved over its surface, scraping the seed along to the point of delivery, whence it would alway bank up more or less, and pass out in clumps or clusters.

What I claim as my invention, and desire to secure by Letters Patent of the United States, is—

1. The arrangement of the wind-guard $g$, or its equivalent, with the delivery-wheel W, substantially as and for the purpose set forth.

2. The adjustable clamping-bar E, in combination with the wheel W and the case C, substantially as shown and described, and for the purpose specified.

3. The arrangement of a series of complete hoppers in the bottom of the grain-box of seed-drills, in combination with the distributers, substantially as and for the purposes herein shown and described.

C. P. BROWN.

Witnesses:
   WM. S. LOUGHBOROUGH,
   L. M. NEWTON.